United States Patent
Ma

(10) Patent No.: US 9,930,114 B2
(45) Date of Patent: Mar. 27, 2018

(54) CODE-DIVISION-MULTIPLE-ACCESS (CDMA)-BASED NETWORK CODING FOR MASSIVE MEMORY SERVERS

(71) Applicant: Empire Technology Development LLC, Wilmington, DE (US)

(72) Inventor: Xudong Ma, Clifton Park, NY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 387 days.

(21) Appl. No.: 14/526,434

(22) Filed: Oct. 28, 2014

(65) Prior Publication Data
US 2016/0119423 A1   Apr. 28, 2016

(51) Int. Cl.
G06F 15/167 (2006.01)
H04L 29/08 (2006.01)
H04B 1/707 (2011.01)

(52) U.S. Cl.
CPC ......... *H04L 67/1097* (2013.01); *H04B 1/707* (2013.01)

(58) Field of Classification Search
CPC .............. H04L 67/1097; H04B 1/707
See application file for complete search history.

(56) References Cited

U.S. PATENT DOCUMENTS

| | | | | |
|---|---|---|---|---|
| 6,819,334 B1* | 11/2004 | Owada | .................. | G09G 5/393 345/649 |
| 7,706,774 B1* | 4/2010 | Lee | .................. | H04M 3/42136 379/114.2 |
| 8,274,265 B1* | 9/2012 | Khanna | ............... | H02M 3/1584 323/225 |
| 2002/0160721 A1* | 10/2002 | Kanemoto | ............. | H04B 1/707 455/69 |
| 2005/0180492 A1* | 8/2005 | Dent | .................... | H04B 1/7107 375/144 |
| 2007/0202816 A1* | 8/2007 | Zheng | .................... | H04B 1/707 455/91 |
| 2007/0268959 A1* | 11/2007 | Bi | .......................... | H04J 13/20 375/146 |

(Continued)

OTHER PUBLICATIONS

Fragouli, C., and Soljanin, E., "Network Coding Applications," Foundations and Trends in Networking, vol. 2, No. 2, pp. 135-269 (2007).

(Continued)

*Primary Examiner* — Michael A Keller
(74) *Attorney, Agent, or Firm* — Turk IP Law, LLC

(57) ABSTRACT

Technologies are generally described for code-division-multiple-access (CDMA)-based network-coding for reading data from massive memory servers. According to some examples, data may be modulated by spreading sequences prior to being transmitted from one memory node to another. In addition, the received signals (modulated data) from multiple memory nodes may be combined by a receiver memory node before being forwarded to other memory nodes arranged in a grid of memory nodes. The memory nodes may be assigned communication bandwidths flexibly and rapidly by changing the respective spreading sequences, which may be orthogonal or near-orthogonal for different memory nodes to allow support of random-access burst or dynamic data traffic, and enhancing fault-tolerance.

21 Claims, 9 Drawing Sheets

(56) References Cited

U.S. PATENT DOCUMENTS

| | | | |
|---|---|---|---|
| 2008/0195719 A1* | 8/2008 | Wu | H04L 67/10 709/213 |
| 2008/0232359 A1* | 9/2008 | Kim | H04L 63/0245 370/389 |
| 2009/0060004 A1* | 3/2009 | Papasakellariou | H04J 13/22 375/140 |
| 2009/0299740 A1* | 12/2009 | Jeong | G10L 19/265 704/226 |
| 2010/0107158 A1* | 4/2010 | Chen | G06F 11/1438 718/1 |
| 2011/0188467 A1* | 8/2011 | Kawamura | H04L 5/0053 370/330 |
| 2011/0270899 A1* | 11/2011 | Chen | G06F 12/0253 707/816 |
| 2013/0016629 A1* | 1/2013 | Mallik | H04W 8/005 370/255 |
| 2013/0057423 A1* | 3/2013 | Kurchuk | H04R 25/00 341/155 |
| 2015/0100663 A1* | 4/2015 | Sugimoto | H04L 67/2852 709/213 |

OTHER PUBLICATIONS

Kim, J., et al., "Reconfigurable Memory Bus Systems using Multi-Gbps/pinCDMA I/0 Transceivers," Proceedings of the 2003 International Symposium on Circuits and Systems, vol. 2, pp. 33-36 (2003).

Ravanbakhsh, M., "Towards Optimal Data Transmission by Network Coding," The University of Bergen, pp. 1-58 (Dec. 2009).

* cited by examiner

CODE-DIVISION-MULTIPLE-ACCESS (CDMA)-BASED NETWORK CODING FOR MASSIVE MEMORY SERVERS

BACKGROUND

Unless otherwise indicated herein, the materials described in this section are not prior art to the claims in this application and are not admitted to be prior art by inclusion in this section.

Recent technology trends include use of massive memory servers with capacities in multiple terabytes. In addition to their storage capacity, lower access times and reliability provide competitive edge to massive memory servers. For the massive memory servers, the input/output communication bandwidths between the memory servers and host computers may usually be the bottlenecks of the systems implementing these servers. The memory access time and memory cycle time may be important performance parameters.

SUMMARY

The present disclosure generally describes methods, apparatus, systems, devices, and/or computer program products for code-division-multiple-access (CDMA-based network-coding for massive memory servers.

According to some examples, methods for code-division-multiple-access (CDMA)-based network-coding are described. An example method may include receiving a first signal at a first memory node from a second memory node, the first signal comprising data modulated with a first spreading sequence by the second memory node; combining the first signal, at the first memory node, with a second signal received at the first memory node from a third memory node to form a combined signal, the second signal comprising data modulated with a second spreading sequence by the third memory node; and transmitting the combined signal to a fourth memory node that neighbors the first memory node.

According to other examples, massive memory servers configured to employ code-division-multiple-access (CDMA)-based network-coding are described. An example server may include one or more processor modules and a plurality of interconnected memory nodes communicatively coupled to the one or more processor modules. Each memory node may be configured to be controlled by the one or more processor modules to modulate data stored at each respective memory node with a respective spreading sequence to generate a signal; transmit the signal to at least one neighbor memory node; receive at least two other signals from at least two other neighbor memory nodes; combine the at least two other signals to form a combined signal; and transmit the combined signal to the at least one neighbor memory node.

According to further examples, systems configured to read from massive memory servers through code-division-multiple-access (CDMA)-based network-coding are described. An example system may include one or more massive memory servers, where the one or more massive memory servers may be associated with a network of memory nodes organized into a grid and each memory node is wirelessly or wiredly coupled to neighbor memory nodes. At least one memory node of the network of memory nodes of the one or more massive memory servers may be configured to modulate data stored at each respective memory node with a respective spreading sequence to generate a signal; transmit the signal to at least one neighbor memory node; receive at least two other signals from at least two other neighbor memory nodes; combine the at least two other signals to form a combined signal; and transmit the combined signal to the at least one neighbor memory node.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
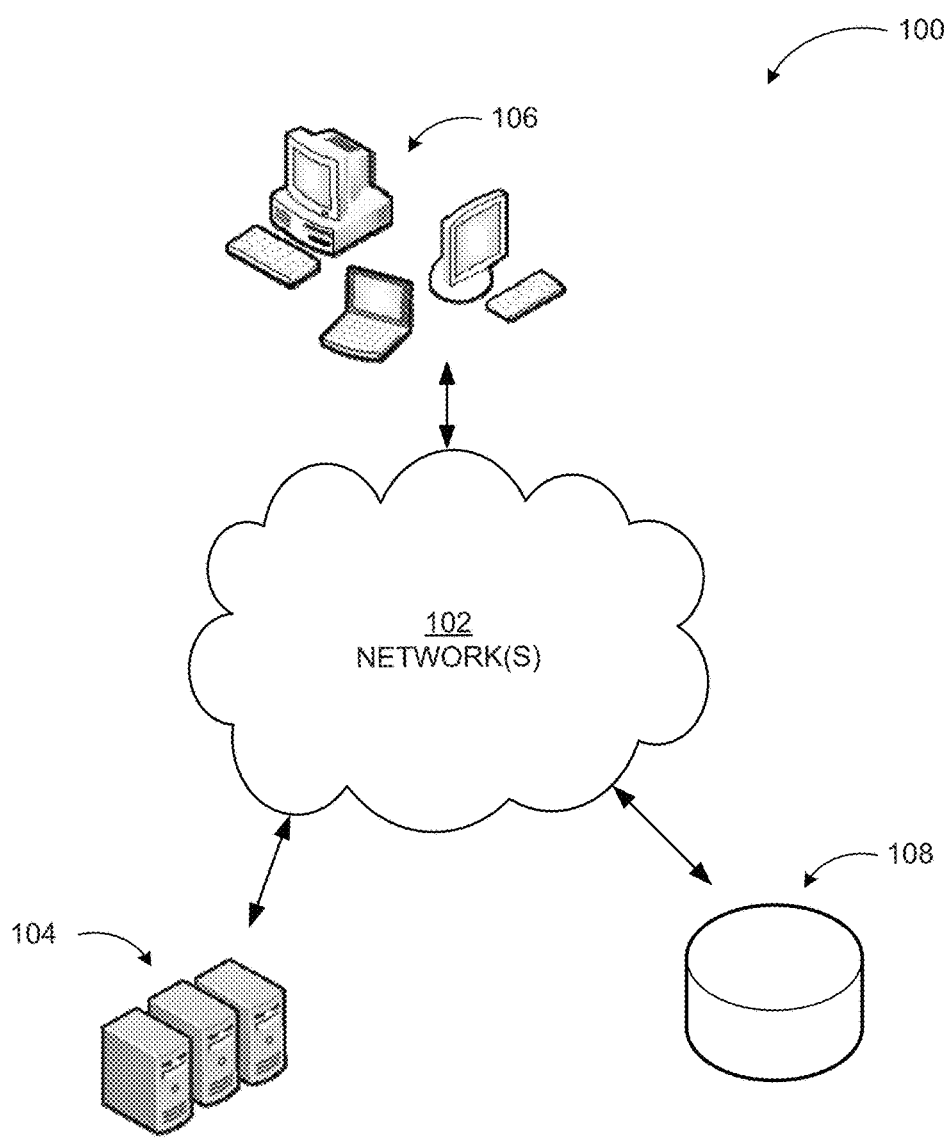
FIG. 1 illustrates an example networked environment, where massive memory servers with code-division-multiple-access (CDMA)-based network-coding may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, and/or devices, related to code-division-multiple-access (CDMA)-based network-coding for massive memory servers.

Briefly stated, technologies are generally described for code-division-multiple-access (CDMA)-based network-coding for reading data from massive memory servers. According to some examples, data may be modulated by spreading sequences prior to being transmitted from one memory node to another. In addition, the received signals (modulated data) from multiple memory nodes may be combined by a receiver memory node before being forwarded to other memory nodes arranged in a grid of memory nodes. The memory nodes may be assigned communication bandwidths flexibly and rapidly by changing the respective spreading sequences, which may be orthogonal or near-orthogonal for different memory nodes to allow support of random-access burst or dynamic data traffic, and enhancing fault-tolerance.

FIG. 1 illustrates an example networked environment, where massive memory servers with code-division-multiple-access (CDMA)-based network-coding may be implemented, arranged in accordance with at least some embodiments described herein.

According to a diagram 100, a host computer (including for instance a server) 104 may communicate to clients 106 and a massive memory server 108 via one or more networks 102. The host computer 104 may be configured to provide data/computing services, such as various applications, virtual machines, data storage, data processing, or other suitable services to the clients 106, such as individual users or enterprise customers at client devices. The host computer 104 may execute applications, virtual machines, and operating systems and/or others on the massive memory server 108, and may exchange application, virtual machine, and operating system data with the massive memory server 108 via the network(s) 102. In some examples, the host computer 104 (including a server) may correspond to a single device; while in other examples the host computer 104 may be implemented as a distributed system that includes multiple devices (including servers) that are collaboratively configured to operate as a single host computer 104.

Embodiments may be implemented in single device and/or distributed device environments including virtual server environments (e.g., the operations recited herein do not necessarily need to be performed in the same single device/node). Furthermore, where reference is made to a processor or processing module performing control operations associated with memory nodes and communications there-between, the control operations may be performed by a single processor with a single core, by a single processor with multiple cores, or by multiple processors (a distributed processor environment).

Figure 2:
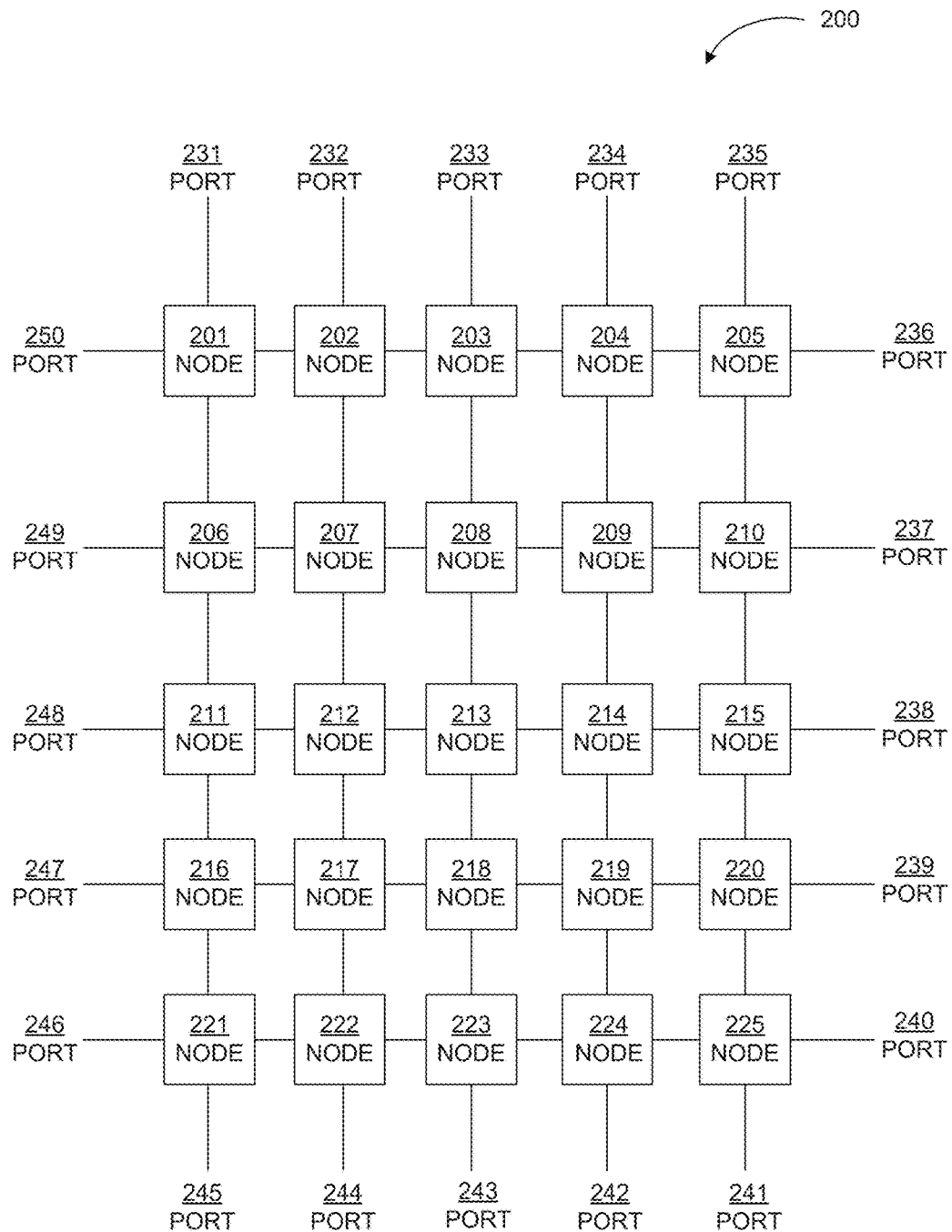
FIG. 2 illustrates an example interconnected system of nodes to implement reading from massive memory servers through CDMA-based network-coding.

FIG. 2 illustrates an example interconnected system of nodes to implement reading from massive memory servers through CDMA-based network-coding, arranged in accordance with at least some embodiments described herein.

According to a diagram 200, a massive memory server such as the massive memory server 108 may include a number of interconnected memory nodes 201-225, some of which may be coupled to input/output (I/O) ports 231-250. In some embodiments, the memory nodes 201-225 may be organized into a grid, where each memory node may be communicatively coupled, via a wired or optical connection, to one or more of its neighbor memory nodes or I/O ports. For example, the memory node 207 may be communicatively coupled to the memory node 202, the memory node 206, the memory node 208, and the memory node 212. As another example, the memory node 201 may be communicatively coupled to the memory node 202, the memory node 206, the I/O port 231, and the I/O port 250. In some embodiments, each memory node may be associated with a corresponding router or communication unit that handles the actual data transmissions and receptions. A memory node as referred to herein may include the communication unit associated with the memory node.

In some embodiments, each of the memory nodes 201-225 may be implemented using dynamic random-access memory (DRAM) or static random-access memory (SRAM) devices. The memory nodes 201-225 may also (or instead) be implemented using flash memory devices, chips, banks of flash memory devices, or any other suitable data storage device or combinations thereof.

In some embodiments, a store-and-forward type routing approach may be used to route data to and from a memory node in the memory nodes 201-225. For example, suppose the memory node 212 has data to be sent out of the massive memory server. The memory node 212 may send the data to the node 211, which may in turn store the data and forward it to the I/O port 248. As a result, memory nodes that do not have direct communicative coupling to an I/O port, such as the memory nodes 207-208, 212-214, and 217-219, may be able to send and receive data through the I/O ports 231-250 by relaying the data through the memory nodes at the periphery. When data stored at a particular memory node is to be transmitted, a memory controller may determine the location of the memory node storing the data, determine a suitable routing path from the memory node to an I/O port, and allocate sufficient bandwidth for the transmission. If no routes or bandwidth are available, then the data transmission may be delayed until sufficient routing resources are available, thereby resulting in reduced memory access and cycle times.

One solution to reduce delays due to transmission resource (that is, routing paths and bandwidth) allocation may be to use code-division-multiple-access (CDMA)-based network coding to encode data passing between the memory nodes 201-225. In the CDMA-based network coding described herein, different memory nodes may be assigned different spreading sequences that are orthogonal (e.g., uncorrelated) or nearly-orthogonal to each other. Data from multiple memory nodes encoded using their respective spreading sequences may be combined and transmitted at the same time, and data from a particular memory node may be decoded using a correlation function based on the spreading sequence associated with the particular memory node.

Figure 3:
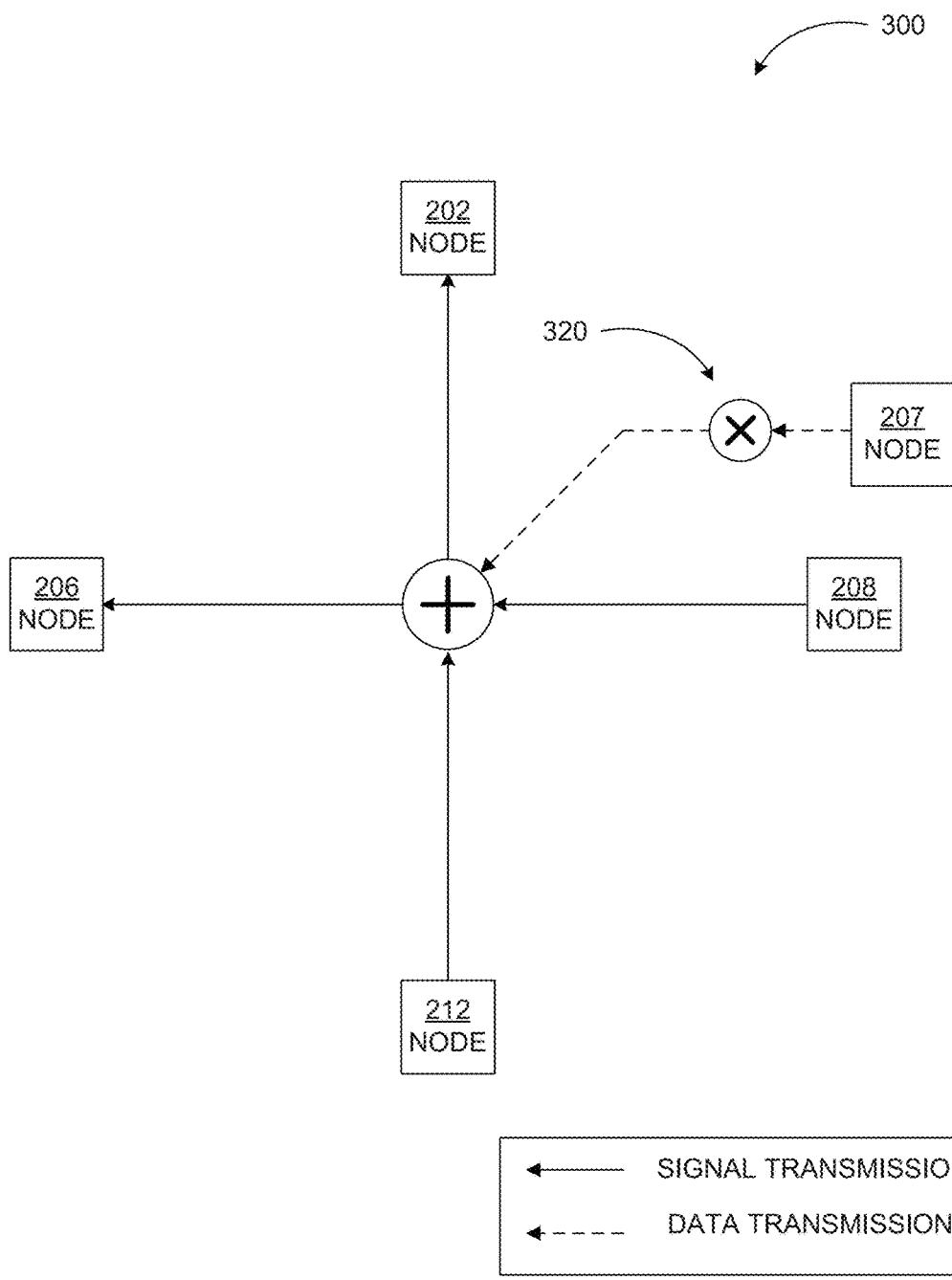
FIG. 3 illustrates an example intermediary router and neighbor memory nodes.

FIG. 3 illustrates an example intermediary router 300 and neighbor memory nodes, arranged in accordance with at least some embodiments described herein.

The intermediary router 300 may be coupled to the memory node 207 of FIG. 2 and to the routers or communication units of its surrounding memory nodes (that is, the memory notes 202, 206, 208, and 212). The intermediary router 300 may be able to receive data to be read out of the massive memory server 108 from the memory nodes 208 and 212 and may be able to send data to be read out to the memory nodes 202 and 206. As described above, each memory node may be associated with a different spreading sequence, which may be preset or dynamically set (or otherwise determined) by, for example, a memory controller. For example, the memory node 207 may have a spreading sequence 320 of [−1, −1, −1, −1, −1, −1, −1, −1]. The memory node 208 may have a spreading sequence of [−1, 1, −1, 1, −1, 1, −1, 1], the memory node 212 may have a spreading sequence of [−1, −1, 1, 1, −1, −1, 1, 1], and the memory node 206 may have a spreading sequence of [−1, −1, −1, −1, 1, 1, 1, 1].

When data originating from a particular memory node is to be transmitted, for example in response to a request from a host computer (such as the host computer 104), the data may be translated into a suitable binary representation and then multiplied by the spreading sequence associated with that memory node. For example, suppose the memory node 207 stores the data [1, 0], which is to be transmitted out of the massive memory server 108. The memory node 207 may first translate the data into a suitable binary representation, which in this disclosure may indicate an encoding that does not involve "0" values. For example, the data [1, 0] may be translated into [1, −1]. This translation may be done so that a "0" data value is not lost when multiple signals are combined, as described below.

After translation into a suitable binary format, the data may then be multiplied by the spreading sequence associated with the originating node. Continuing the example above, the translated data [1, −1] from the node 207 may then be multiplied by the spreading sequence 320 associated with the node 207 to result in a signal [−1, −1, −1, −1, −1, −1, −1, −1, 1, 1, 1, 1, 1, 1, 1, 1].

Suppose then that the memory node 208 stores the data [0, 1]. In order to transmit its stored data to an I/O port through the memory node 207, the memory node 208 may first translate its stored data into a suitable binary representation of [−1, 1]. The memory node 208 may then multiply [−1, 1] with its spreading sequence [−1, 1, −1, 1, −1, 1, −1, 1], resulting in a signal [1,−1,1,−1,1,−1,1,−1,−1,1,−1,1,−1,1,−1,1], which its communication unit may subsequently output to the router 300. Similarly, suppose that the memory node 212 stores the data [1, 0], which translates into a suitable binary representation of [1, −1], similar to the memory node 207. When the memory node 212 transmits its stored data to an I/O port through the memory node 207, the memory node 212 multiplies its data [1, −1] with the its spreading sequence to form the signal [−1,−1,1,1,−1,−1,1,1,1,1,−1,−1,1,1,−1,−1], which its communication unit may subsequently output to the router 300.

Subsequently, the router 300 may sum the signals from the memory node 207, the memory node 208, and the memory node 212 to form a combined signal [−1, −3, 1, −1, −1, −3, 1, −1, 1, 3, −1, 1, 1, 3, −1, 1]. The router 300 may perform the summation using a summation unit, which may be analog or digital as described below. The router 300 may then output this combined signal to the memory nodes 202 and 206 in order to reach an I/O port.

The memory nodes 202 and 206 may then each add their own signals to the combined signal. For example, suppose the memory node 202 has a spreading sequence of [−1, 1, 1, −1, −1, 1, 1, −1] and stored data [1, 1]. The signal formed by multiplying the stored data and the spreading sequence of the memory node 202 is [−1, 1, 1, −1, −1, 1, 1, −1, −1, 1, 1, −1, −1, 1, 1, −1]. When this signal is added to the combined signal received from the memory node 207, the output signal becomes [−2, −2, 2, −2, −2, −2, 2, −2, 0, 4, 0, 0, 0, 4, 0, 0]. In the absence of other input signals, this output signal may then be transmitted to the I/O port 232 coupled to the memory node 202. Similarly, suppose the memory node 206 stores data [−1, −1] (translated from [0, 0]) and has a spreading sequence of [−1, −1, −1, −1, 1, 1, 1, 1]. The signal formed by the memory node 206 may then be [1, 1, 1, 1, −1, −1, −1, −1, 1, 1, 1, 1, −1, −1, −1, −1]. When this signal is added to the combined signal received from the memory node 207, the output signal from the memory node 206, in the absence of other input signals, becomes [0, −2, 2, 0, −2, −4, 0, −2, 2, 4, 0, 2, 0, 2, −2, 0], which may then be output to I/O port 249.

After an output signal has reached an I/O port, the portion of the output signal corresponding to the data signal from a particular memory node may be decoded using the spreading sequence for that particular memory node. Continuing the example above, the output signal at the I/O port 232 may be [−2, −2, 2, −2, −2, −2, 2, −2, 0, 4, 0, 0, 0, 4, 0, 0]. The portion of the output signal corresponding to the data from the memory node 207 may be determined by computing the correlation between the output signal and the spreading sequence 320 of the memory node 207. The correlation thus computed is [8, −8], which may be thresholded or reduced to obtain the final result of [1, −1], corresponding to the [1, 0] data stored at the memory node 207. Similarly, computing the correlation of the output signal to the spreading sequence of the memory node 208 produces [−8, 8], which may be thresholded or reduced to obtain the final result of [−1, 1], corresponding to the [0, 1] data stored at the memory node 208. As a result, data signals from multiple memory nodes may be combined into a single signal, reducing routing resource requirements and corresponding transmission delays.

As mentioned above, the summation unit that performs the summing operations may be analog or digital. For example, in one embodiment the signals to be summed may be treated as analog signals, and the summation unit may be implemented using an analog circuit. In another embodiment, the signals to be summed may be digital signals (for example, 8-bit fixed point representations of some integers), and the summation unit may be implemented using a digital circuit.

The length of a spreading sequence may affect how long a signal encoded with the spreading sequence takes to transmit. A signal encoded with a shorter spreading sequence may be transmitted faster than a signal encoded with a longer spreading sequence. In situations where individual memory nodes may have burst data transmission (e.g., data transmission occurring in bursts, with pauses between bursts), the memory controller may assign shorter spreading sequences to memory nodes that communicate more often, resulting in faster data transmission. On the other hand, the memory controller may assign longer spreading sequences to memory nodes that communicate less often, resulting in slower data transmission. In some embodiments, the memory controller may be able to dynamically reassign and update spreading sequences to account for changing traffic and data conditions.

The CDMA-based network coding described herein may also provide significant fault tolerance. In the event of a memory node failure, the failed memory node may output a constant data stream (for example, ". . . 1111111 . . . ") or some other specific signal. In this situation, the router (for example, the router 300) may still be able to receive, sum, and transmit signals from neighbor nodes. At the I/O ports, the data stream from the failed memory node may be treated as a known interference signal and canceled out without affecting other signal transmissions.

Figure 4:
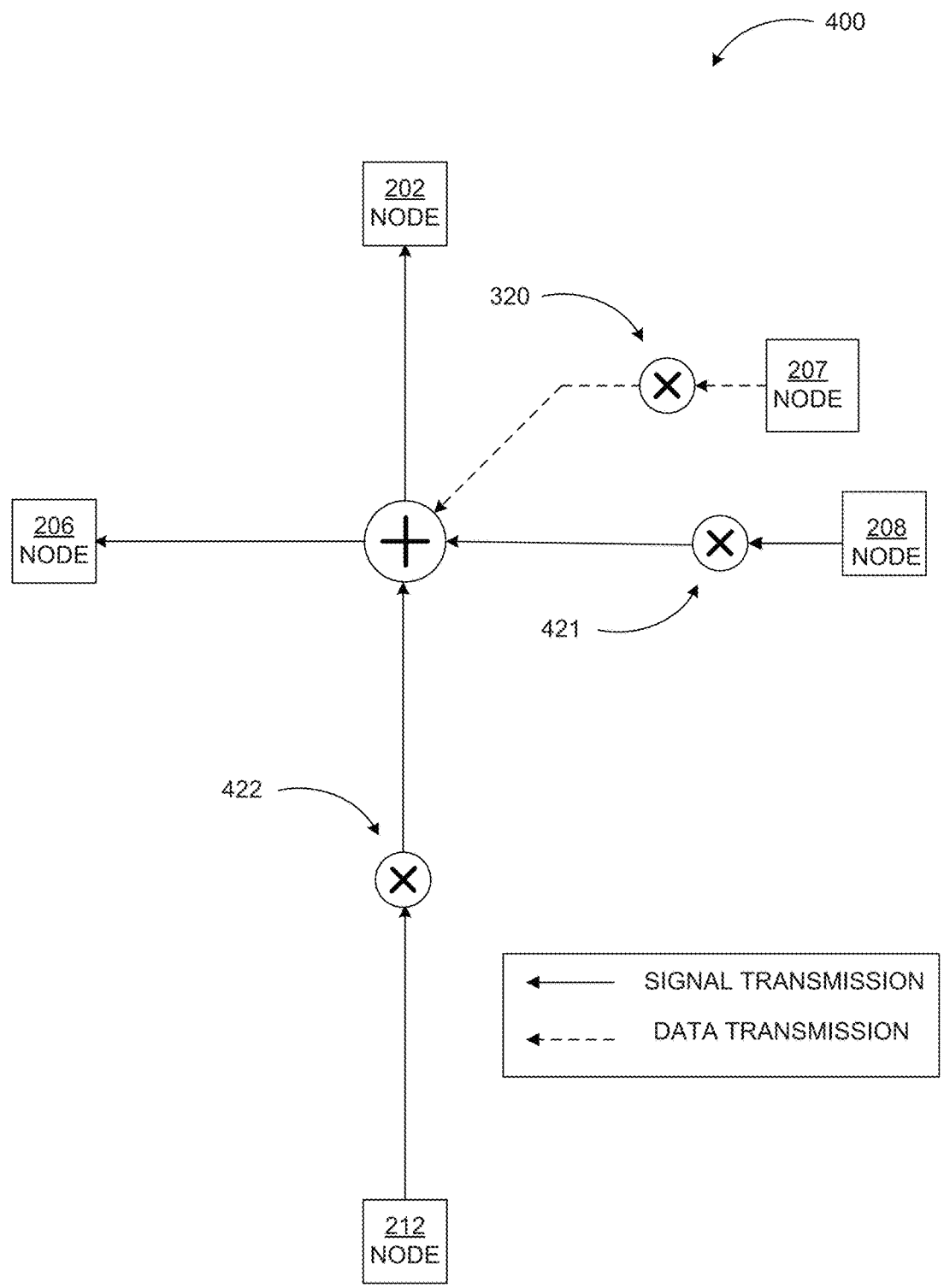
FIG. 4 illustrates another example intermediary router and neighbor memory nodes.

FIG. 4 illustrates another example intermediary router 400 and neighbor memory nodes, arranged in accordance with at least some embodiments described herein.

The router 400 may be similar to the router 300 above, with similarly-numbered elements operating similarly. The router 400 may also include amplification coefficients 421 and 422, coupled to the signal paths from the memory node 208 and the memory node 212, respectively. The amplification coefficients 421 and 422 may be implemented using analog amplifiers or digital multipliers or other types of devices or components and/or combinations thereof, and in some embodiments may be used to increase the amplitude or values of the signals respectively received from the memory nodes 208 and 212. In some embodiments, the amplification coefficients 421 and 422 may be implemented at the communication units associated with their respective memory nodes.

Figure 5:
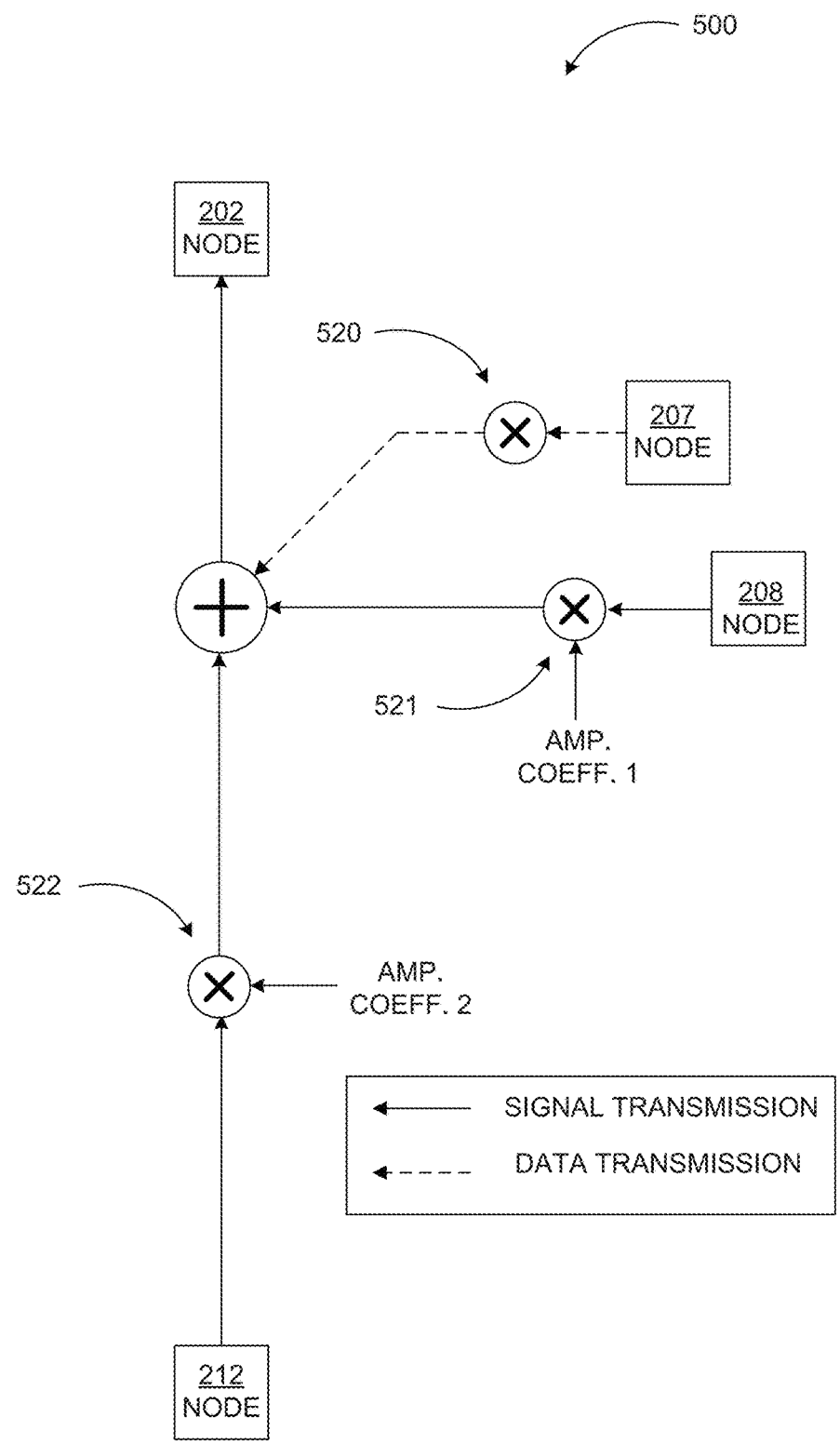
FIGS. 5 and 6 illustrate example intermediary router portions and neighbor memory nodes, where different amplification coefficients may be applied to signals destined for different nodes prior to combination.
Figure 6:
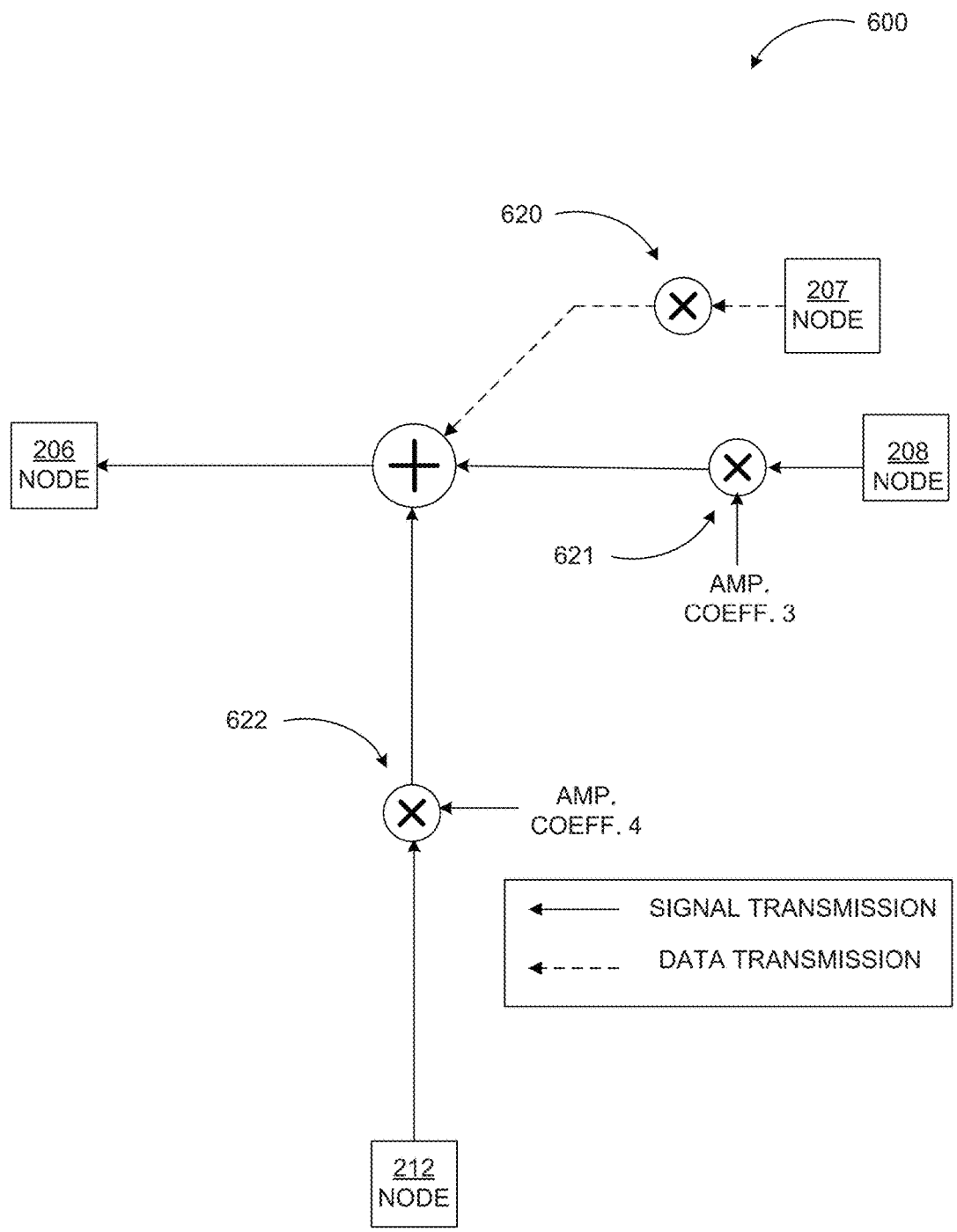

FIGS. 5 and 6 illustrates example intermediary router portions and neighbor memory nodes, where different amplification coefficients may be applied to signals destined for different nodes prior to combination, arranged in accordance with at least some embodiments described herein.

In some embodiments, a router or communication unit may have separate communication paths for transmitting signals to different nodes. This use of separate communication paths may allow received signals to be amplified differently. For example, a router portion 500, depicted in FIG. 5, may apply a first amplification coefficient 521 to the signal from the memory node 208 and a second amplification coefficient 522 to the signal from the memory node 212. The received signals may be summed with the output signal from the memory node 207, which may also be amplified using an amplification coefficient 520, and then provided to the memory node 202 and not to the memory node 206.

Similarly, a router portion 600 depicted in FIG. 6 may apply a third amplification coefficient 621 (different from the first amplification coefficient 521) to the signal from the memory node 208 and a fourth amplification coefficient 622 (different from the second amplification coefficient 522) to the signal from the memory node 212. The received signals may be summed with the output signal from the memory node 207, which may also be amplified using an amplification coefficient 620 (which may be different from the amplification coefficient 520), and then provided to the memory node 206 but not to the memory node 202.

Figure 7:
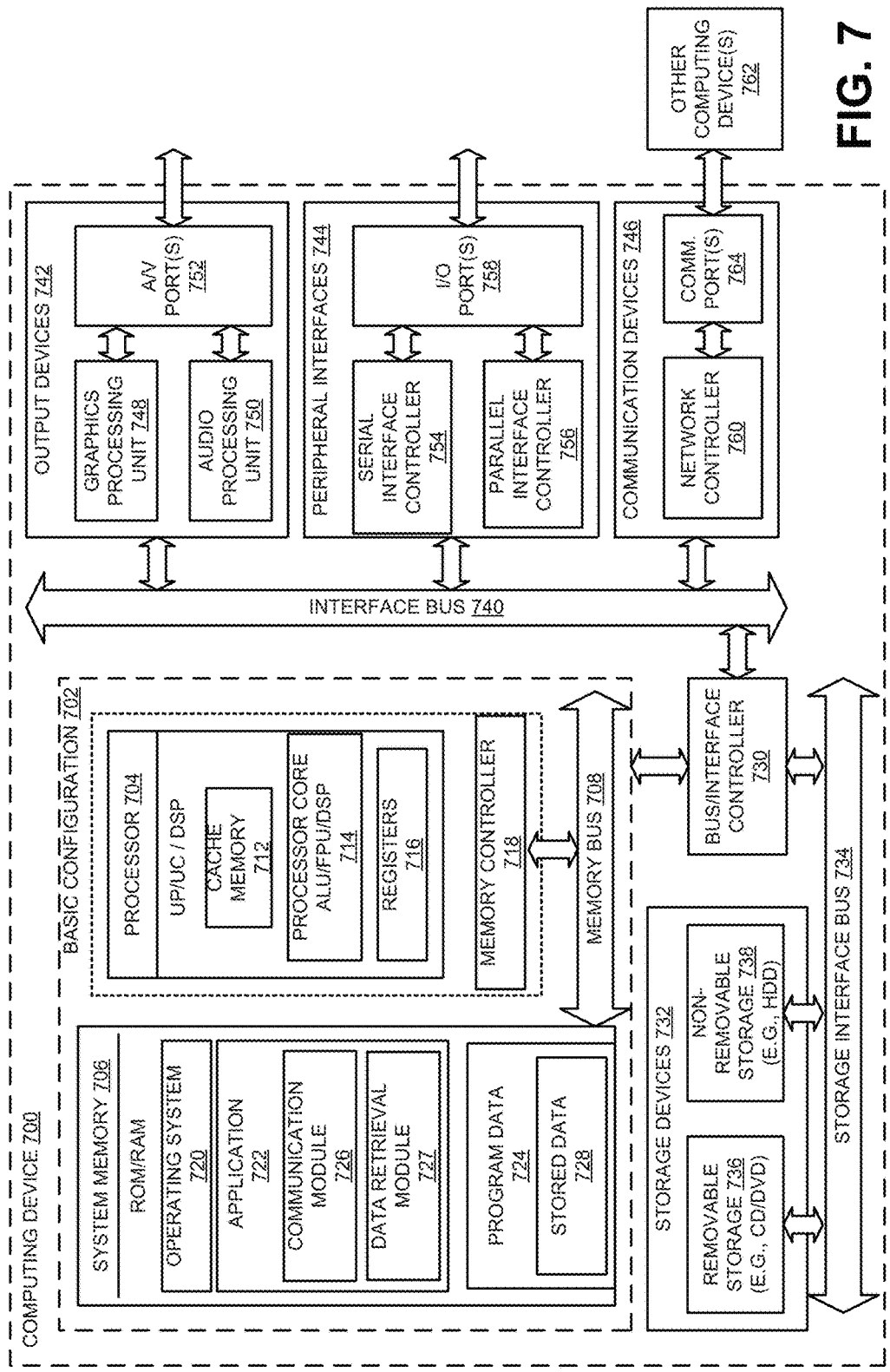
FIG. 7 illustrates a general purpose computing device, which may be used to employ CDMA-based network-coding in data retrieval from interconnected memory nodes.

FIG. 7 illustrates a general purpose computing device, which may be used to employ CDMA-based network-coding in data retrieval from interconnected memory nodes, arranged in accordance with at least some embodiments described herein.

For example, the computing device 700 may be implemented as host computer 104 shown in FIG. 1 and used to perform data reads using CDMA-based network-coding as described herein. In an example basic configuration 702, the computing device 700 may include one or more processors 704 and a system memory 706. A memory bus 708 may be used to communicate between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor (DSP), or any combination thereof The processor 704 may include one more levels of caching, such as a level cache memory 712, a processor core 714, and registers 716. The example processor core 714 may include an arithmetic logic unit (ALU), a floating point unit (FPU), a digital signal processing core (DSP core), or any combination thereof An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, an application 722, and program data 724. The application 722 may include a communication module 726 and a data retrieval module 727 to implement data retrieval from interconnected memory nodes using CDMA-based network-coding as described herein. The program data 724 may include, among other data, stored data 728 or the like, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., one or more output devices 742, one or more peripheral interfaces 744, and one or more communication devices 766) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 766 includes a network controller 760, which may be arranged to facilitate communications with one or more other computing devices 762 over a network communication link via one or more communication ports 764. The one or more other computing devices 762 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Figure 8:
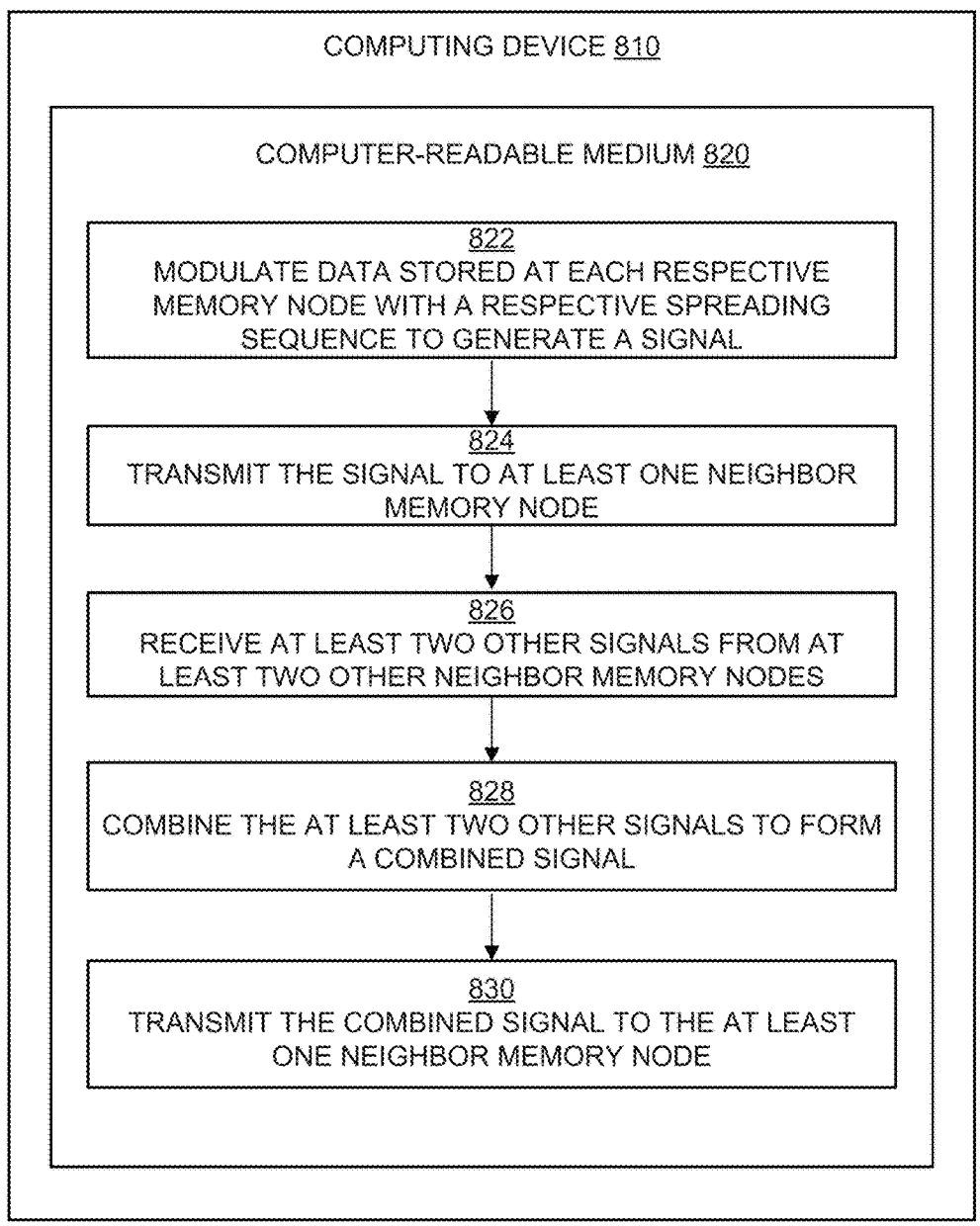
FIG. 8 is a flow diagram illustrating an example method to read from massive memory servers through CDMA-based network-coding that may be performed by a computing device such as the computing device in FIG. 7.

FIG. 8 is a flow diagram illustrating an example method to read from massive memory servers through CDMA-based network-coding that may be performed by a computing device such as the computing device in FIG. 7, arranged in accordance with at least some embodiments described herein.

Example methods may include one or more operations, functions, or actions as illustrated by one or more of blocks 822, 824, 826, 828, and/or 830, and may in some embodiments be performed by a computing device such as the computing device 700 in FIG. 7. The operations described in the blocks 822-830 may also be performed in response to execution of computer-executable instructions stored in a computer-readable medium such as a computer-readable medium 820 of a computing device 810.

An example process to read from massive memory servers through CDMA-based network-coding may begin with block 822, "MODULATE DATA STORED AT EACH RESPECTIVE MEMORY NODE WITH A RESPECTIVE SPREADING SEQUENCE TO GENERATE A SIGNAL", where data stored at each memory node may be translated by the intermediary router 300 into a suitable binary format and then multiplied by the intermediary router 300 with a spreading sequence associated with the respective memory node, as described above.

Block 822 may be followed by block 824, "TRANSMIT THE SIGNAL TO AT LEAST ONE NEIGHBOR MEMORY NODE", where the signal may be transmitted by the intermediary router 300 to one or more neighbor memory nodes en route to an I/O port, as described above.

Block 824 may be followed by block 826, "RECEIVE AT LEAST TWO OTHER SIGNALS FROM AT LEAST TWO OTHER NEIGHBOR MEMORY NODES", where a neighbor memory node (e.g., a "receiver memory node") may receive at least two signals from two other neighbor nodes, as depicted above in FIGS. 3-6.

Block 826 may be followed by block 828, "COMBINE THE AT LEAST TWO OTHER SIGNALS TO FORM A COMBINED SIGNAL", where the receiver memory node may combine the received signals to form a combined signal, as described above. The receiver memory node may combine the received signals by using an analog or digital summation unit.

Block 828 may be followed by block 830, "TRANSMIT THE COMBINED SIGNAL TO THE AT LEAST ONE NEIGHBOR MEMORY NODE", where the receiver memory node may transmit the combined signal to the one or more neighbor memory nodes of block 824 en route to an I/O port, as described above.

Figure 9:
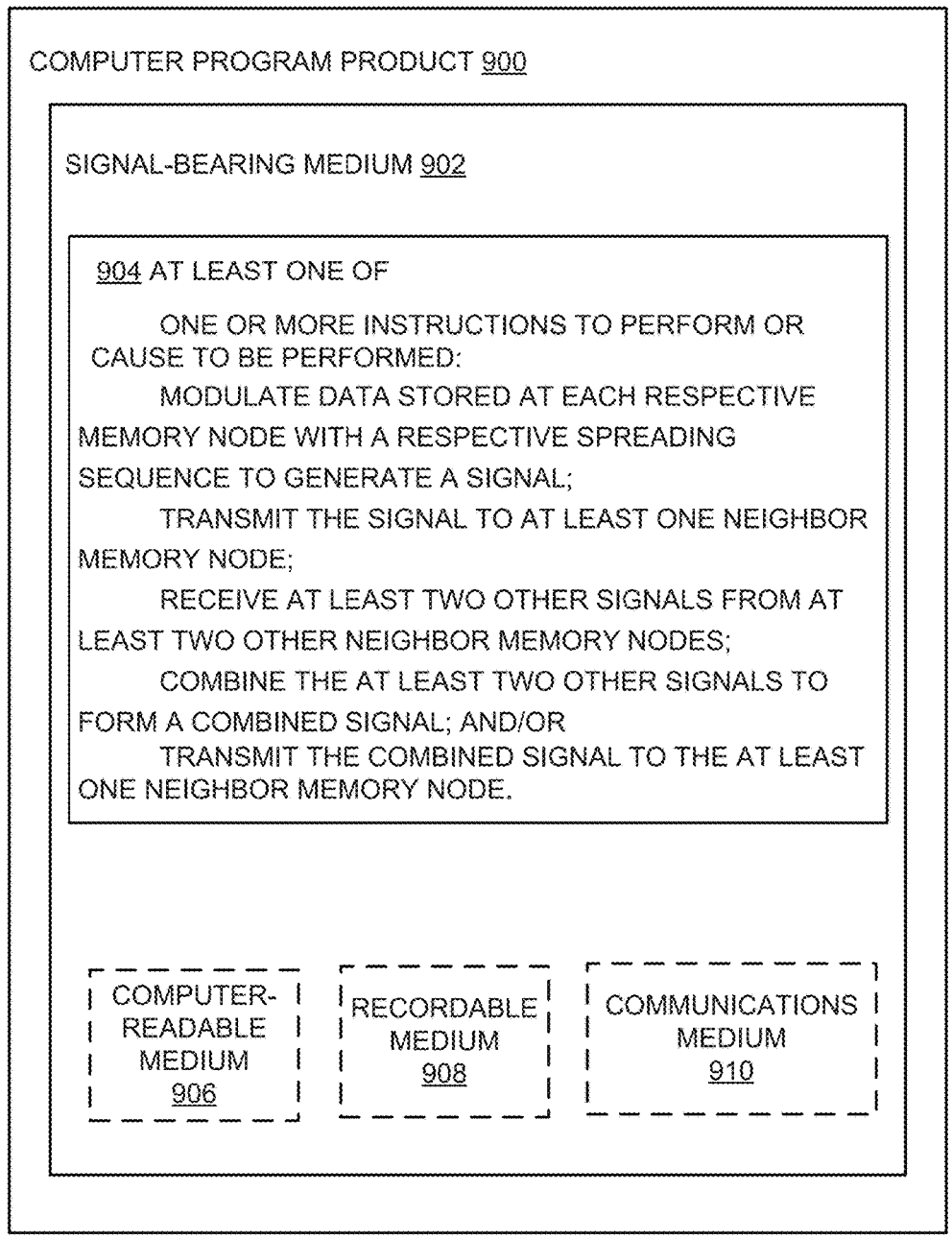
FIG. 9 illustrates a block diagram of an example computer program product, all arranged in accordance with at least some embodiments described herein.
Figure 7:
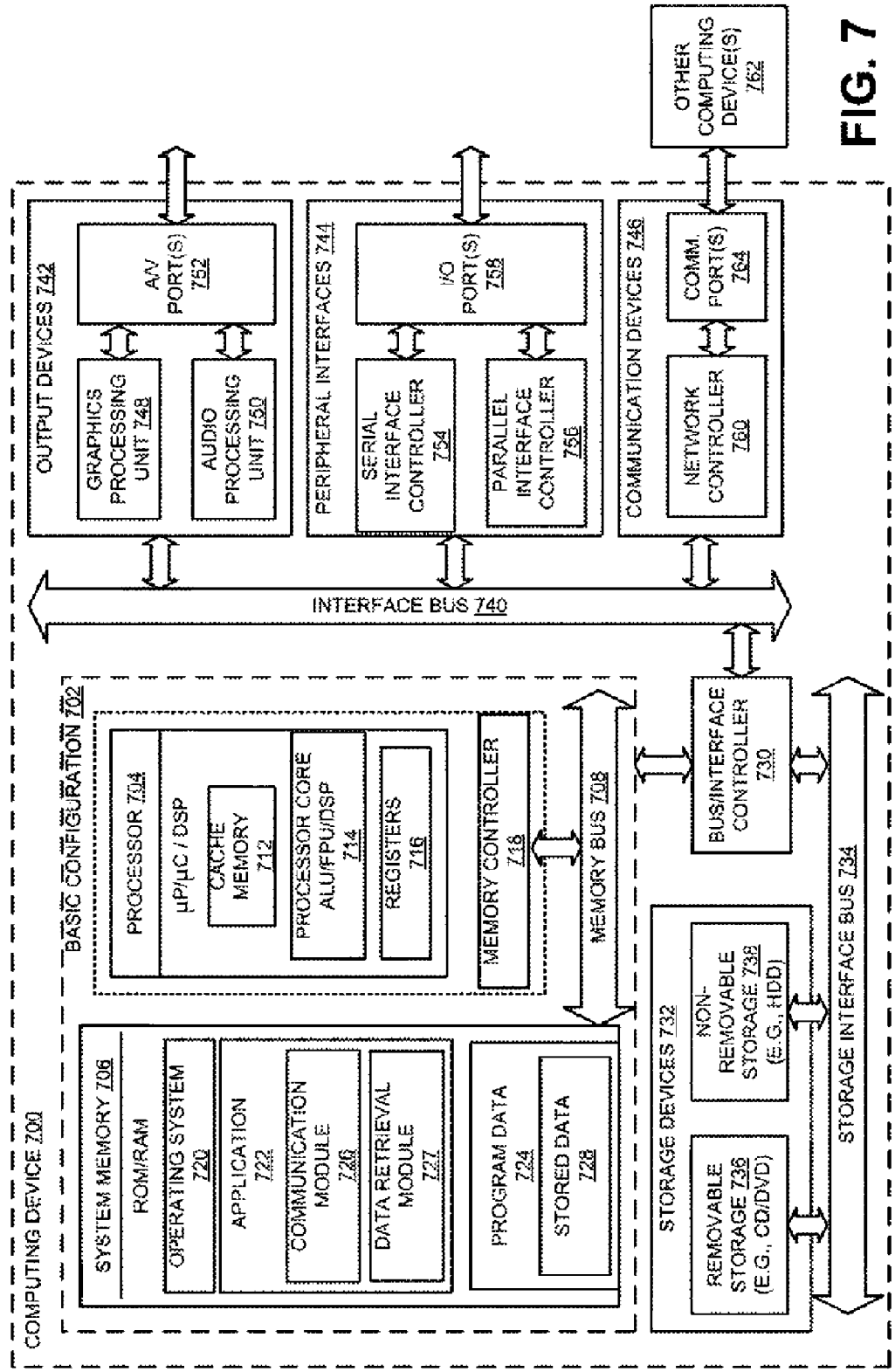

FIG. 9 illustrates a block diagram of an example computer program product, arranged in accordance with at least some embodiments described herein.

In some examples, as shown in FIG. 9, a computer program product 900 may include a signal bearing medium 902 that may also include one or more machine readable instructions 904 that, in response to execution by, for example, a processor may provide the functionality and features described herein. Thus, for example, referring to the processor 704 in FIG. 7, the data retrieval module 727 may undertake one or more of the tasks shown in FIG. 9 in response to the instructions 904 conveyed to the processor 704 by the medium 902 and executed by the processor 704 to perform or cause to be performed actions associated with reads from massive memory servers through CDMA-based network-coding as described herein. Some of those instructions may include, for example, instructions to modulate data stored at each respective memory node with a respective spreading sequence to generate a signal, transmit the signal to at least one neighbor memory node, identify at least two other signals received from at least two other neighbor memory nodes, combine the at least two other signals to form a combined signal, and/or transmit the combined signal to the at least one neighbor memory node, according to some embodiments described herein.

In some implementations, the signal bearing media 902 depicted in FIG. 9 may encompass tangible non-transitory computer-readable media 906, such as, but not limited to, a hard disk drive, a solid state drive, a compact disc (CD), a digital versatile disk (DVD), a digital tape, memory, etc. In some implementations, the signal bearing media 902 may encompass recordable media 907, such as, but not limited to, memory, read/write (R/W) CDs, R/W DVDs, etc. In some implementations, the signal bearing media 902 may encompass communications media 910, such as, but not limited to, a digital and/or an analog communication medium (e.g., a fiber optic cable, a waveguide, a wired communications link, a wireless communication link, etc.). Thus, for example, the program product 900 may be conveyed to one or more modules of the processor 704 by an RF signal bearing medium, where the signal bearing media 902 is conveyed by the wireless communications media 910 (e.g., a wireless communications medium conforming with the IEEE 802.11 standard).

According to some examples, methods for code-division-multiple-access (CDMA)-based network-coding are described. An example method may include receiving a first signal at a first memory node from a second memory node, the first signal comprising data modulated with a first spreading sequence by the second memory node; combining the first signal, at the first memory node, with a second signal received at the first memory node from a third memory node to form a combined signal, the second signal comprising data modulated with a second spreading sequence by the third memory node; and transmitting the combined signal to a fourth memory node that neighbors the first memory node.

According to other examples, the method may also include combining the first signal and the second signal, at the first memory node, with a third signal received at the first memory node from a fifth memory node to form the combined signal, the third signal comprising data modulated with a third spreading sequence by the fifth memory node. The method may further include generating a fourth signal at the first memory node by modulating data with a fourth spreading sequence; and transmitting the fourth signal to the fourth memory node that neighbors the first memory node. The method may also include selecting the fourth spreading sequence based on a communication bandwidth usable for the first memory node, where the first, second, and fourth spreading sequences are distinct from each other.

According to further examples, selecting the fourth spreading sequence may include selecting a longer spreading sequence in response to determination that the first memory node is assigned a lower communication rate compared to other memory nodes, selecting a shorter spreading sequence in response to determination that the first memory node is assigned a higher communication rate compared to other memory nodes, or selecting the fourth spreading sequence to be one of an orthogonal or a nearly orthogonal spreading sequence relative to the second spreading sequence and the third spreading sequence.

According to yet other examples, the method may further include one or more of transmitting a specific signal to the fourth memory node after one of the second memory node and the third memory node is determined to fail; after receiving the specific signal from one of the second memory node and the third memory node, recognizing the specific signal as known interference and removing the specific signal from received signals; or multiplying each received signal with an amplification coefficient at the first memory node. The method may also include using two or more communication paths between the first memory node and the fourth memory node, where combining the first signal and the second signal includes combining the first signal and the second signal by employing one of an analog summation or a digital summation.

According to other examples, massive memory servers configured to employ code-division-multiple-access (CDMA)-based network-coding are described. An example server may include one or more processor modules and a plurality of interconnected memory nodes communicatively coupled to the one or more processor modules. Each memory node may be configured to be controlled by the one or more processor modules to modulate data stored at each respective memory node with a respective spreading sequence to generate a signal; transmit the signal to at least one neighbor memory node; receive at least two other signals from at least two other neighbor memory nodes; combine the at least two other signals to form a combined signal; and transmit the combined signal to the at least one neighbor memory node.

According to further examples, the plurality of memory nodes may be coupled by interconnection networks organized into a grid and each memory node may be coupled to neighbor memory nodes through one of a wired connection or an optical connection. Each memory node may be further configured to translate the data into a binary representation prior to modulation. Each memory node may also be configured to employ a random-access, burst memory-access communication protocol. Each memory node may include one of a flash memory device, a dynamic random access memory (DRAM) device, or a static random access memory (SRAM) device.

According to yet other examples, each flash memory node may include a flash memory chip or a flash memory bank. The one or more processor modules may be configured to select a different spreading sequence for each memory node based on a communication bandwidth assigned to each memory node. The one or more processor modules may also be configured to assign different communication bandwidths dynamically to different memory nodes by change of respective spreading sequences.

According to further examples, systems configured to read from massive memory servers through code-division-multiple-access (CDMA)-based network-coding are described. An example system may include one or more massive memory servers, where the one or more massive memory servers may be associated with a network of memory nodes organized into a grid and each memory node is wirelessly or wiredly coupled to neighbor memory nodes. At least one memory node of the network of memory nodes of the one or more massive memory servers may be configured to modulate data stored at each respective memory node with a respective spreading sequence to generate a signal; transmit the signal to at least one neighbor memory node; receive at least two other signals from at least two other neighbor memory nodes; combine the at least two other signals to form a combined signal; and transmit the combined signal to the at least one neighbor memory node.

According to some examples, the respective spreading sequences for each memory node may include one of orthogonal or nearly orthogonal spreading sequences. The massive memory servers may be configured to enable multiple communication flows to occupy a same transmission line within networks of the plurality of memory nodes without explicit resource allocation through the orthogonal or near-orthogonal spreading sequences. The massive memory servers may also be configured to select a longer spreading sequence for memory nodes that are assigned a lower communication rate compared to other memory nodes and a shorter spreading sequence for memory nodes that are assigned a higher communication rate compared to other memory nodes. Wirelessly coupled memory nodes may be optically or radio frequency (RF) coupled.

According to yet other examples, the at least one memory node of the one or more massive memory servers may be included in a single massive memory server such that the modulate data, transmit the signal, receive at least two other signals, combine the at least two other signals, and transmit the combined signal are performed in the single massive memory server. The at least one memory node of the one or more massive memory servers may include a plurality of memory nodes associated with a virtual single massive memory server such that the modulate data, transmit the signal, receive at least two other signals, combine the at least two other signals, and transmit the combined signal are performed in the virtual single massive memory server. The at least one memory node of the one or more massive memory servers may include a plurality of memory nodes associated with a plurality of the massive memory servers such that at least some of the modulate data, transmit the signal, receive at least two other signals, combine the at least two other signals, and transmit the combined signal are performed in a distributed manner amongst the plurality of memory nodes associated with the plurality of massive memory servers.

Various embodiments may be implemented in hardware, software, or combination of both hardware and software (or other computer-readable instructions stored on a non-transitory computer-readable storage medium and executable by one or more processors); the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and designing the circuitry and/or writing the code for the software and or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. Also, the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a compact disc (CD), a digital versatile disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method for code-division-multiple-access (CDMA)-based network-coding for a network, the method comprising:
    receiving a first signal at a first memory node from a second memory node, wherein the first signal comprises data modulated with a first spreading sequence that is dynamically assigned to the first signal;
    receiving a second signal at the first memory node from a third memory node, wherein the second signal comprises data modulated with a second spreading sequence that is dynamically assigned to the second signal, and
    wherein the dynamic assignment of the first spreading sequence and the second spreading sequence is based on one or more network parameters of the network;
    combining the received first signal with the received second to form a combined signal at the first memory node;
    transmitting the combined signal to a fourth memory node that neighbors the first memory node, wherein the first memory node, the second memory node, the third memory node, and the fourth memory node comprise data storage devices within a massive memory server and are communicatively coupled to neighboring memory nodes;
    detecting a failure of at least one of the second memory node and the third memory node; and
    transmitting a constant data stream via the first memory node to the fourth memory node without the transmission of the combined signal being affected.

2. The method of claim 1, wherein combining includes:
    combining the received first signal and the received second signal, at the first memory node, with a third signal received at the first memory node from, a fifth memory node to form the combined signal, wherein the third signal comprises data modulated with a third spreading sequence by the fifth memory node.

3. The method of claim 2, further comprising:
    generating a fourth signal at the first memory node by modulating data with a fourth spreading sequence; and
    transmitting the fourth signal to the fourth memory node that neighbors the first memory node.

4. The method of claim 3, further comprising:
    selecting the fourth spreading sequence based on a communication bandwidth usable for the first memory node, wherein the first spreading sequence, the second spreading sequence, and the fourth spreading sequence are distinct from each other.

5. The method of claim 4, wherein selecting the fourth spreading sequence comprises one of:
    selecting a longer spreading sequence in response to a determination that the first memory node is assigned a lower communication rate compared to other memory nodes;
    selecting a shorter spreading sequence in response to a determination that the first memory node is assigned a higher communication rate compared to other memory nodes; or
    selecting the fourth spreading sequence to be an orthogonal spreading sequence relative to the second spreading sequence and the third spreading sequence.

6. The method of claim 1, further comprising:
    transmitting a specific signal to the fourth memory node after one of the second memory node and the third memory node is determined to have failed.

7. The method of claim 1, further comprising:
    multiplying each received signal with an amplification coefficient at the first memory node.

8. The method of claim 1, wherein combining the received first signal with the received second signal comprises combining the received first signal and the received second signal by employing one of an analog summation or a digital summation.

9. A massive memory server configured to employ code-division-multiple-access (CDMA)-based network-coding for a network, the server comprising:
    one or more processors; and
    a plurality of interconnected memory nodes communicatively coupled to the one or more processors, wherein at least one memory node of the plurality of interconnected memory nodes is configured to be controlled by the one or more processors to:
        dynamically assign, a respective spreading sequence to each respective memory node, based on one or more network parameters of the network;
        modulate data stored at each respective memory node with the assigned respective spreading sequence to generate a signal;

transmit the signal to at least one neighbor memory node;
receive at least two other signals from at least two other neighbor memory nodes;
combine the at least two other signals to form a combined signal;
transmit the combined signal from the at least one memory node to the at least one neighbor memory node;
detect a failure of one of the at least two other neighbor memory nodes; and
transmit a constant data stream via the failed one of the at least two other neighbor memory nodes to the at least one neighbor memory node without the transmission of the combined signal being affected.

10. The server of claim 9, wherein the plurality of interconnected memory nodes is coupled by interconnection networks organized into a grid, and wherein each memory node of the plurality of interconnected memory nodes is coupled to neighbor memory nodes through one of a wired connection or an optical connection.

11. The server of claim 9, wherein each memory node of the plurality interconnected memory nodes is further configured to translate the data into a binary representation prior to modulation.

12. The server of claim 9, wherein each memory node of the plurality interconnected memory nodes is further configured to employ a random-access, burst memory-access communication protocol.

13. The server of claim 9, wherein each memory node of the plurality of interconnected memory nodes includes one of a flash memory device, a dynamic random access memory (DRAM) device, or a static random access memory (SRAM) device.

14. The server of claim 9, wherein the one or more processors are configured to:
select a different spreading sequence for each memory node of the plurality of interconnected memory nodes based on a communication bandwidth assigned to each memory node; and
assign different communication bandwidths dynamically to different memory nodes of the plurality of interconnected memory nodes by change of respective spreading sequences.

15. A system configured to read from massive memory servers through code-division-multiple-access (CDMA)-based network-coding for a network, the system comprising:
one or more massive memory servers associated with a network of memory nodes that are organized into a grid, wherein each memory node is wirelessly or wiredly coupled to neighbor memory nodes, and
wherein at least one memory node of the network of memory nodes is configured to:
dynamically assign a respective spreading sequence to each respective memory node based on one or more network parameters of the network;
modulate data stored at each respective memory node with the assigned respective spreading sequence to generate a signal;
transmit the signal to at least one neighbor memory node;
receive at least two other signals from at least two other neighbor memory nodes;
combine the at least two other signals to form a combined signal;
transmit the combined signal from the at least one memory node to the at least one neighbor memory node;
detect a failure of one of the at least two other neighbor memory nodes; and
transmit a constant data stream via the failed one of the at least two other neighbor memory nodes to the at least one neighbor memory node without the transmission of the combined signal being affected.

16. The system of claim 15, wherein the assigned respective spreading sequences for each respective memory node includes orthogonal spreading sequences.

17. The system of claim 16, wherein the massive memory servers are configured to enable multiple communication flows to occupy a same transmission line within networks of memory nodes without explicit resource allocation through the orthogonal spreading sequences.

18. The system of claim 15, wherein the massive memory servers are configured to select:
a longer spreading sequence for memory nodes that are assigned a lower communication rate compared to other memory nodes; and
a shorter spreading sequence for memory nodes that are assigned a higher communication rate compared to other memory nodes.

19. The system of claim 15, wherein the at least one memory node of the one or more massive memory servers is included in a single massive memory server such that the data modulation, the signal transmission, the reception of the at least two other signals, the combination of the at least two other signals, and the transmission of the combined signal are performed in the single massive memory server.

20. The system of claim 15, wherein the at least one memory node of the one or more massive memory servers includes a plurality of memory nodes associated with a virtual single massive memory server such that the data modulation, the signal transmission, the reception of the at least two other signals, the combination of the at least two other signals, and the transmission of the combined signal are performed in the virtual single massive memory server.

21. The system of claim 15, wherein the at least one memory node of the one or more massive memory servers includes a plurality of memory nodes associated with a plurality of the massive memory servers such that at least some of the data modulation, the signal transmission, the reception of the at least two other signals, the combination of the at least two other signals, and the transmission of the combined signal are performed in a distributed manner amongst the plurality of memory nodes associated with the plurality of massive memory servers.

* * * * *

UNITED STATES PATENT AND TRADEMARK OFFICE
CERTIFICATE OF CORRECTION

PATENT NO. : 9,930,114 B2
APPLICATION NO. : 14/526434
DATED : March 27, 2018
INVENTOR(S) : Ma It is certified that error appears in the above-identified patent and that said Letters Patent is hereby corrected as shown below:

In the Drawings

In Fig. 7, Sheet 7 of 9, delete "UP/UC / DSP" and insert -- µP/µC/DSP --, as shown on attached sheet.

In the Specification

In Column 7, Line 7, delete "illustrates" and insert -- illustrate --, therefor.

In Column 7, Line 53, delete "thereof The" and insert -- thereof. The --, therefor.

In Column 7, Line 54, delete "one more" and insert -- one or more --, therefor.

In Column 7, Line 58, delete "thereof An" and insert -- thereof. An --, therefor.

In Column 7, Line 60, delete "implementations the" and insert -- implementations, the --, therefor.

In Column 8, Line 32, delete "solid state drives," and insert -- solid state drives (SSD), --, therefor.

In Column 8, Line 55, delete "device 766" and insert -- device 746 --, therefor.

In Column 10, Line 10, delete "medium 902" and insert -- signal bearing medium 902 --, therefor.

In Column 10, Line 24, delete "media 902" and insert -- medium 902 --, therefor.

In Column 10, Line 27, delete "hard disk drive, a solid state drive," and insert -- hard disk drive (HDD), a solid state drive (SSD), --, therefor.

In Column 10, Line 29, delete "media 902" and insert -- medium 902 --, therefor.

In Column 10, Line 30, delete "media 907," and insert -- medium 908, --, therefor.

Signed and Sealed this
Nineteenth Day of June, 2018

Andrei Iancu
*Director of the United States Patent and Trademark Office*

In Column 10, Line 32, delete "media 902" and insert -- medium 902 --, therefor.

In Column 10, Line 33, delete "media 910," and insert -- medium 910, --, therefor.

In Column 10, Line 35, delete "communications link," and insert -- communication link, --, therefor.

In Column 10, Line 37, delete "program product 900" and insert -- computer program product 900 --, therefor.

In Column 10, Line 39, delete "media 902" and insert -- medium 902 --, therefor.

In Column 10, Line 40, delete "media 910" and insert -- medium 910 --, therefor.

In Column 13, Line 27, delete "and or" and insert -- and/or --, therefor.

In Column 13, Line 51, delete "hard disk drive," and insert -- hard disk drive (HDD), --, therefor.

In Column 13, Line 53, delete "solid state drive," and insert -- solid state drive (SSD), --, therefor.

In Column 14, Line 51, delete "recitation no" and insert -- recitation, no --, therefor.

In Column 15, Line 7, delete "general such" and insert -- general, such --, therefor.

In the Claims

In Column 15, Line 62, in Claim 1, delete "second to" and insert -- second signal to --, therefor.

In Column 16, Line 12, in Claim 2, delete "from, a" and insert -- from a --, therefor.

In Column 16, Line 30, in Claim 5, delete "sequence in" and insert -- sequence, in --, therefor.

In Column 16, Line 34, in Claim 5, delete "sequence in" and insert -- sequence, in --, therefor.